July 2, 1963 R. A. RAPUANO 3,096,490

TRAVELING WAVE DEVICE MODULATION SYSTEM

Filed Feb. 28, 1957 2 Sheets-Sheet 1

INVENTOR
ROBERT A. RAPUANO
BY Elmer J Gorn
ATTORNEY

TRAVELING WAVE DEVICE MODULATION SYSTEM

INVENTOR
ROBERT A. RAPUANO
BY Elmer J Gorn
ATTORNEY 3,096,490
Patented July 2, 1963

3,096,490

TRAVELING WAVE DEVICE MODULATION SYSTEM

Robert A. Rapuano, Dedham, Mass., assignor to Raytheon Company, a corporation of Delaware Filed Feb. 28, 1957, Ser. No. 643,152
19 Claims. (Cl. 331—82)

This invention relates to modulating circuits for use with a traveling wave electron discharge device adapted to operate either as an amplifier of electromagnetic signals or as an oscillator which transmits signals over a wide frequency band in response to a modulating voltage, and, more particularly, to a method of producing a modulating voltage through the use of an energy storage device in the electrode supply circuit of one or more of said traveling wave devices.

In traveling wave devices of the backward wave type in which electrons are projected in an extended stream in the vicinity of a wave-propagating structure, oscillatory energy is produced by the interaction or transfer of energy from the electron stream to a backward wave which propagates along the wave-propagating structure, commonly referred to as a signal transmission network, at a velocity substantially equal to that of the electron stream.

The frequency of oscillations generated as a result of such interaction or feedback can be controlled by varying the velocity of the electron stream above or below a particular value substantially equal to the velocity of the backward wave, and the tube can be swept through a wide frequency band by application of a modulating voltage to an electrode, which controls the space current of the tube and thus the velocity of the electron stream. Also, the backward wave device or tube commences oscillation when the electron beam current exceeds a critical value which, for convenience, may be designated as $I_0$, while the device functions as a narrow band, voltage tunable, backward wave amplifier when the beam current is adjusted below this value. It should be understood that oscillations at a beam current above the value $I_0$ for a given voltage representing a particular beam velocity occur at substantially the frequency to which the device has peak amplification when the beam current is below the critical value $I_0$, the beam velocity being held substantially constant. This particular operational characteristic permits the backward wave tube, during the transmitting mode of operation, to sweep through the same predetermined wide frequency band as when the tube is in the receiving mode of operation. Varying the frequency of a traveling wave tube usually results in large power losses inside the modulating tube and, accordingly, the delivery of a substantially higher voltage by the anode supply is required to compensate for the voltage drop through the modulator tube, which increases the over-all size and heat dissipation of the entire modulator system.

In accordance with the present invention, losses in the modulating tube are minimized by using a tuned circuit connected in series with the anode supply and the anode electrode of a voltage tuned traveling wave tube operating in the aforementioned oscillatory mode. The tuned circuit is excited by a modulating voltage derived from an oscillator operating at the frequency of the tuned circuit and usually fed through a modulator tube which causes the anode voltage and, therefore, the frequency of the traveling wave tube to vary or modulate at the frequency of the exciting oscillator. While the energy required for this voltage fluctuation is obtained from the anode power supply, the tuned circuit acts as an energy-storing tank, and the associated modulator tube is required to dissipate only energy changes in the tuned circuit and the relatively small amount of power resulting from the finite dynamic impedance of the traveling wave tube anode.

The invention further discloses a method of generating the sweep voltage by applying the oscillator voltage directly to the accelerator electrode of the traveling wave tube while the aforementioned tuned circuit remains connected in series with the anode supply. In this manner the current through the traveling wave tube is made to vary at the frequency of the oscillating voltage, and, when the changing current so produced is impressed across the impedance of the tuned circuit, the anode voltage of the traveling wave tube varies around a center or bias voltage level and thereby sweeps the tube to a frequency range represented by the applied modulating voltage. It should be understood that, while the current through the traveling wave tube depends almost completely upon the accelerator electrode voltage and only slightly upon the anode-to-sole voltage, the current through the anode circuit of the traveling wave tube remains substantially constant, the amount of variation being only sufficient to generate the desired voltage across the resonant circuit.

The invention further discloses a method of feeding energy back from the tuned circuit in the anode voltage supply circuit to the acceleration electrode of the voltage-tuned traveling wave tube, the energy being fed back at the proper phase angle to maintain oscillation. Moreover, this method insures that the oscillation frequency is at all times equal to the frequency of the tuned circuit, and at the same time eliminates the requirement of a separate source of modulating voltage. While it should be understood that a wide frequency band is swept by applying the sine wave voltage output of the tuned or resonant circuit to the anode of the traveling wave tube, the invention further contemplates the use of a sawtooth sweep voltage, which can be produced by the addition of other tuned circuits in series with the fundamental tuned circuit and tuned to the odd harmonics of the modulating frequency.

In addition, the invention is not limited to a system consisting of a single voltage-tuned traveling wave oscillator. Any number of traveling wave tubes of comparable frequency operating in either the oscillatory or amplifying mode can be cascaded to form a chain or injection-locked voltage-swept units, each having a tuned circuit in series with the anode power supply for the efficient generation of widely-varying sweep voltages; or a single power supply may be used as a source for a plurality of voltage-swept units connected in parallel.

Other objects and features of this invention will be understood more clearly and fully from the following detailed description of the invention with reference to the accompanying drawings wherein.

Figure 1:
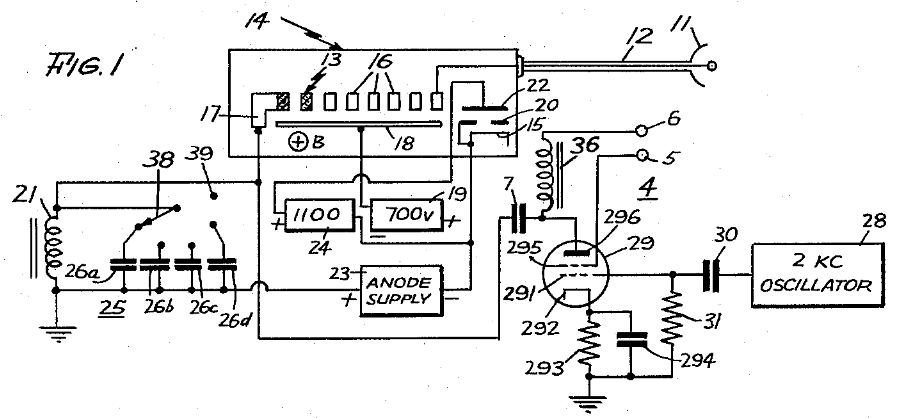
FIG. 1 is a schematic diagram of a traveling wave tube provided with a modulating system in accordance with the invention.

Referring now to FIG. 1 showing the schematic diagram of a modulation system for the backward wave tube used as an oscillator, an antenna 11 is provided to transmit recurring signals, such as radio signals, communication signals, radar signals, and the like, which are fed to the antenna by means of a coaxial transmission line 12 connected to the end adjacent the electron source of the signal transmisison network 13 of backward wave tube 14.

The traveling wave tube oscillator 14, as shown, includes a grid 20, an acceleration electrode 22 and a cathode 15 positioned at the other end of the signal transmission network 13 and provided with a heater, not shown. The purpose of the cathode 15 is to emit electrons which, under the influence of the proper electrostatic and magnetic fields produced in the space adjacent the signal transmission network, will move along paths adjacent a series of interdigital fingers 16 forming said network and, after amplifying any signal present in the network through interaction therewith, will impinge on collector electrode 17 or on the signal transmission network 13, which serves as an anode. Signal transmission network 13 is maintained at the same potential as the collector electrode 17, or at some other potential relative to the cathode. The structural details of the cathode 15, collector electrode 17 and the remaining elements and electrical connections comprising the backward wave tube 14 will be described below. Extending adjacent interdigital fingers 16, and forming a space through which the electron beam travels, is an elongated electrode 18, commonly referred to as a sole, which, in this embodiment, is maintained negative with respect to the cathode 15 by a 700 volt power supply 19. The grid or control electrode 20 is connected to the cathode 15, as shown in FIG. 1, and the acceleration electrode 22 is connected to the nominal 1100 volt power supply 24 which determines whether the beam current will remain above or below the aforementioned $I_0$ value in a manner which will be described in detail below.

In accordance with the invention, voltage tuning of the backward wave tube is accomplished by effectively changing the sole-to-anode voltage by control of the cathode-to-anode voltage by means of a novel modulating circuit 25, the sole being maintained at a constant voltage reference with respect to cathode. The tuned circuit which is connected in series with grounded anode supply 23 and the anode 17 comprises an inductance 21 and a plurality of capacitors **26*a*, 26*b*, 26*c* and 26*d*, which are connected in parallel with the inductance 21 to select, by means of switch 38, different values of reactance for the different rates of sweep. For example, the inductance 21 is 1.5 henries and the capacitance 26*a* is .002 microfarad to provide a sweep over the 500 megacycle band at a rate of 2.0 kilocycles per second. The main anode supply 23 sets the frequency of the center of the swept band, and the modulating voltage for producing the sweep is obtained from a 2 kilocycle oscillator 28 feeding the grid 291 of a 3D21A type modulator tube 29 in a modulator circuit 4 through a .1 microfarad coupling capacitor 30 and a 100,000 ohm input resistor 31. The modulator tube cathode 292 is connected to ground through a 100 ohm cathode bias resistor 293 and a .1 microfarad bias capacitor 294. The screen grid 295 of the modulator tube is connected to a source of 300 volts direct current at terminal 5 while the plate 296 is connected through a conventional 4.0 henry modulation choke 36 to a source of 900 volts direct current with respect to ground at terminal 6. As noted, the tuned circuit is excited by the oscillator 28 operating at the frequency of the tuned circuit and a modulating voltage output of tube 29 is applied to the tuned circuit 25 through a .5 microfarad coupling capacitor 7. In operation, therefore, the reactance of the tuned circuit 25 acts as an energy storage device which causes the anode voltage of the backward wave oscillator to vary around the anode supply voltage by ±750 volts with only approximately 12 watts driving power to the modulator tube 29**. In this manner, the modulator tube is required to dissipate only the losses of the tuned circuit and a small amount of power represented by the relatively high dynamic impedance of the backward wave oscillator anode. This small dissipation is substantially less than the approximately 250 watts dissipated by a conventional series tube modulator. For this reason, a smaller, lighter weight and more compact power supply, which in this case need be capable of delivering approximately 3000 volts direct current, rather than 4000 volts direct current as required with a series tube modulator, can be used as the anode power supply.

It should be understood that other sweep frequencies can be obtained by shunting condensers **26*b*, 26*c* or 26*d*, which can have values of .001, .0005 and .002, respectively, the oscillator 28 being adjusted to the higher resonant frequency of the tuned circuit 25. In addition, switch 38 can be set to the open circuit tap 39, and the inductance 21 will resonate in response to a broader band of oscillator frequencies and with the requirement of a relatively greater amount of driving power. As is known, the value of the driving voltage depends in part upon the deviation frequency desired. Thus, for operation in other frequency bands, more or less driving voltage will be needed, depending upon the design and impedance of the backward wave tube 14**, which, as shown, is capable of a tuning range of 1.4 to 1.0.

Figure 2:
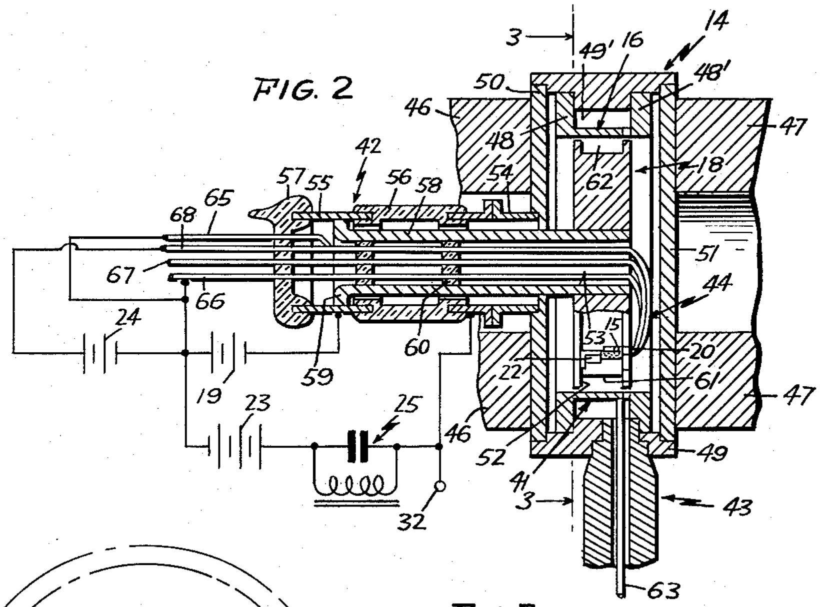
FIG. 2 is a detailed view of a portion of the anode assembly of a backward traveling wave oscillator tube employing a transverse magnetic field.
Figure 3:
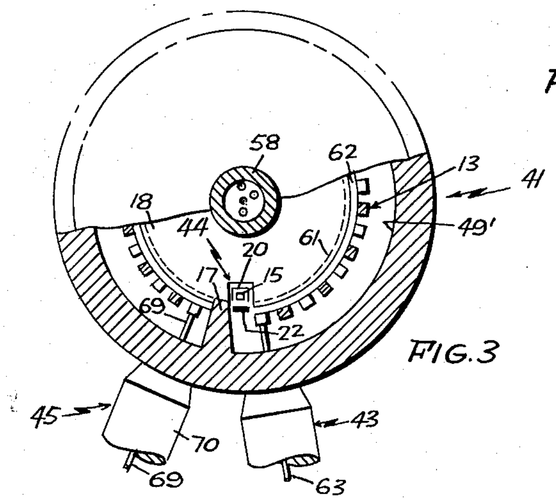
FIG. 3 is a section view taken along the line 3—3 of FIG. 2.
Figure 5:
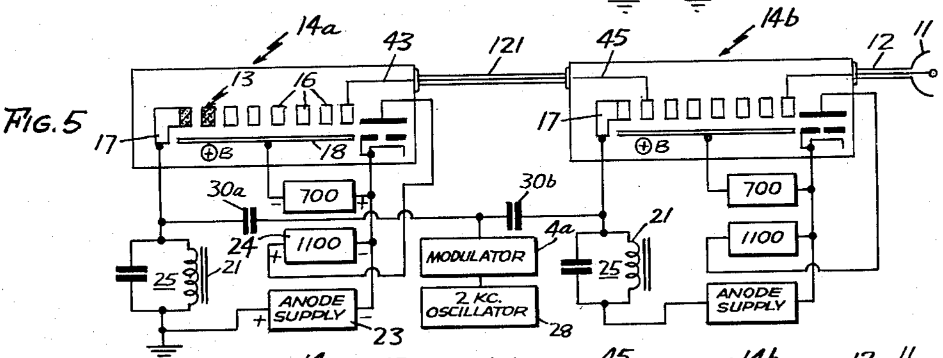
FIG. 5 is a diagrammatic view of a further embodiment of the system according to the invention in which two oscillator tubes are employed.
Figure 6:
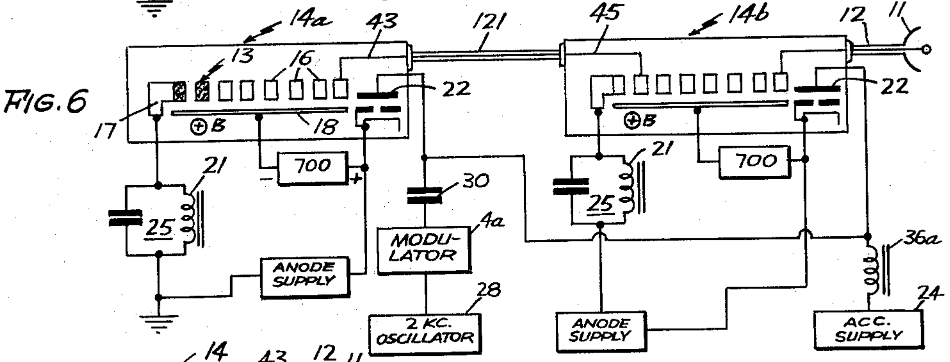
FIG. 6 is a schematic diagram of a modification of the system shown in FIG. 5.

Referring now to FIGS. 2 and 3, a backward wave tube 14 is shown which comprises an anode assembly 41 which includes the energy propagating structure or signal transmission line including interdigital fingers 16, the elongated electrode or sole 18 which, as noted, is maintained negative with respect to the interdigital fingers forming anode delay line 13, a lead-in assembly 42 and an output coupling means 43. In addition, there is shown an electron gun mounting assembly 44 including the cathode 15 containing a heater (not shown), a control grid 20, an input coupling means 45 for use when more than a single backward wave tube is used as shown in FIGS. 5 and 6, and a transverse magnetic field-producing means 46—47, a portion of which is indicated in FIG. 2. In the single oscillator shown in FIG. 1, internal attenuation may be introduced at the end of the anode delay line 13 remote from cathode 15 to eliminate frequency discontinuities in the oscillator during tuning and to take care of reflection which may arise at the interconnection between the tubes. This attenuation may take the form of a thin coating of glossy material, such as graphite, applied to the end of the delay line 13, as by spraying a solution of graphite mixed with a suitable binder, or by coating the delay line with iron by electroplating techniques. The attenuation is indicated in FIG. 1 and in succeeding figures of the drawings by cross-hatching or oblique lines drawn through the anode delay line 13.

Referring now to FIGS. 2 and 3, the interdigital fingers 16 comprising the signal transmission line include a plurality of members which extend from oppositely-disposed annular members 48 and 48', respectively. These members are secured by screws, not shown, to the shoulder portion of a cylindrical thermally-conductive ring 49—49' to which is hermetically sealed a pair of oppositely-disposed cover plates 50 and 51.

The sole 18 consists of a cylindrical block of material, such as copper, having a centrally-located aperture 53 to permit connection of lead-in assembly 42 and to allow for passage of external circuit-connecting leads.

Referring more particularly to FIG. 2, the lead-in assembly 42 comprises an electrically-conductive cylindrical sleeve 54, which is inserted in an aperture in cover plate 50. Interconnecting metal sleeve 54 and outer metal sleeve 55 is a section of cylindrical glass tubing 56. The other end of sleeve 55 is provided with a glass seal 57 for sealing the tube 14 after evacuation. The assembly 42 is arranged perpendicularly to cover plate 50 of tube 14 and further includes an elongated electrically-conductive tubular supporting cylinder 58, which serves as a main support for sole 18 and is affixed at one end to the periphery of aperture 53 in sole 18. The outward end of cylinder 58 contains an outwardly flared portion 59, which is connected to the inner surface of outer metal sleeve 55. The necessary leads for the electron gun are fed through supporting cylinder 58 and are insulatedly supported therefrom by one or more glass beads 60. The interdigital fingers comprising the signal transmission line 13 are arranged concentrically with sole 18 and are separated from the circumferential wall 61 of the sole to form an interaction space 62 through which the stream of electrons generated in the tube passes. As noted, the interdigital delay line or signal transmission network 13 including interdigital fingers 16 may be terminated at one end by attenuation, which may be in the form of an energy dissipative material, such as iron, applied to the fingers. The coaxial output coupling means 43 is sealed in an opening of wall 49 of the anode and is impedance-matched to the interdigital delay line 13. The inner conductor 63 of coaxial output coupling means 43 is connected to a finger at or adjacent the end of the periodic anode delay line 13 adjacent the electron gun.

The backward wave tube 14 may be provided with a collector electrode 17, as shown in FIG. 3, for intercepting electrons after one traversal of the arcuate interaction space. This collector electrode may take the form of a projection from the back wall 49' of the interdigital delay line 13. In some instances, however, the collector electrode may be omitted and the electron stream made reentrant. Furthermore, the sole 18 may be either primarily or secondarily electron-emissive.

Electron gun assembly 44 for the backward wave tube, shown in FIGS. 2 and 3, includes the grid 20, the cathode 15 with a heater inserted therein, not shown, and an acceleration electrode 22, as shown in FIG. 2. More particularly, the cathode 15 is shown, by way of example, as a rectangular body provided with a circular bore, not shown, in which the heater is inserted. The cathode body 15 has at least the surface facing the accelerating anode 22 coated with an electron-emissive material, such as a compound of barium. Cathode 15 is positioned within the wall 61 of sole 18. The cathode lead 66 is connected electrically to the cathode 15. One end of the heater, not shown, is connected to the inner wall of the cathode body, while the other end of the heater is attached to the heater lead 67, shown in FIG. 2.

The auxiliary electrode 22 which, in effect, is an accelerating anode serving to aid in the production of the desired electron beam trajectory, is insulatedly supported from flange portion 52 of sole 18. The auxiliary electrode lead 68 is attached to the auxiliary or acceleration electrode 22.

A suitable electric field between anode and sole may be obtained by means of a voltage applied therebetween. The sole 18 may be negatively biased with respect to the cathode by means of the supply source 19 of voltage connected between the cathode lead 66 and tubular sleeve 58, by way of metal sleeve 55. The cathode may, in some applications, be at the same potential as the sole. The grid 20 may be maintained at negative potential with respect to the cathode by a grid supply source of voltage, not shown, or may be directly connected to cathode lead 66 through grid lead 65, only partially shown in FIG. 2. Similarly, the signal transmission network or anode delay line 13, as shown in FIG. 3, is maintained at a positive potential relative to the sole and cathode by means of anode supply source 23 of voltage connected between metal sleeve 54 and tuned circuit 25, which is connected in turn to the modulator output at terminal 32 and to the anode transmission line 13 and cathode lead 66. As noted, the auxiliary or acceleration electrode 22 is provided with a positive potential relative to the cathode by means of supply source 24 of voltage connected between leads 66 and 68.

A uniform magnetic field transverse to the direction of propagation of the electron beam is provided either by a permanent magnet or an electromagnet having cylindrical pole pieces 46 and 47 radially positioned on or adjacent the tube. Pole piece 46 is apertured to receive the lead-in assembly 42 and pole piece 47 is apertured to maintain symmetry of the magnetic field. The flux lines should be concentrated in the interaction space 62 between sole 18 and cylindrical transmission network 13. By proper adjustment of the magnitude and polarity of the magnetic and electric fields, the electron beam may be made to follow a circular path about interaction space 62 under the combined influence of these transversely disposed fields.

As noted, the radio frequency energy generated in the interaction space 62 traveling along signal transmission line 13 sets up a high frequency electromagnetic field which may be analyzed as a series of space harmonics, some of which travel in one direction (clockwise) along the anode structure, the others of which travel counterclockwise, and all of which travel with differing phase velocities. If the electron beam is synchronized with the proper space harmonic, interaction of the beam and the space harmonic will result in the production of oscillations within the tube. The oscillations can be controlled by changing the electron beam current above or below the critical value $I_0$, thereby selecting the mode of operation of the tube, that is, of amplifications or oscillations. The energy travels through the aforementioned space toward the electron gun and is extracted at the gun end of the signal transmission line 13 by way of the coaxial output line 43.

Backward wave tube 14, when used as a driven tube, further includes the input coupling assembly 45 comprising an inner conductor 69 and an outer conductor 70 coaxially arranged with respect to one another. The inner conductor 69, as shown in FIG. 3, is connected to one of the fingers 16 at or adjacent the end of the anode transmission line 13 electrically removed from the electron gun, while the outer conductor 70 may be attached to the cylindrical wall 49 of anode assembly 41. The input coupling means 45, as well as the output coupling means 43, need not be coaxial; for example, the energy may be coupled to or from signal transmission line 13 by means of a waveguide.

It should be understood that the delay line or signal transmission network 13 may not be of the interdigital type, but may be any suitable periodic delay structure such as a helix, disc-loaded waveguide, or the like. As noted, tuning of the backward wave oscillator may be accomplished by varying the voltage between the signal transmission line 13 and sole 18, as will be described in detail below. However, tuning of the backward wave tube 14, also, may be accomplished by varying the magnetic field strength, either by varying the position of the magnet pole pieces in the case of a permanent magnet or by varying the electric current in the case of an electromagnet having a coil surrounding the core. Variation of both the electric field and the magnetic field simultaneously, of course, is possible.

Figure 4:
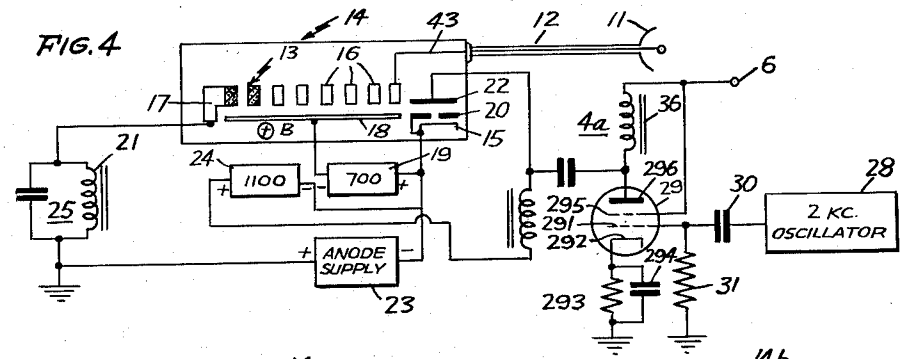
FIG. 4 is a schematic diagram of a modification of the system shown in FIG. 1.

Referring now to FIG. 4, there is shown a circuit diagram of another embodiment of the system described generally in FIG. 1. In FIG. 4, where the elements are shown in FIG. 1, the same reference numbers are used. In FIG. 4, the backward wave oscillator 14 acts as a modulator, and the requirement of a separate modulator tube is eliminated. The tuned circuit is connected in series with the anode supply 23 and anode 17, and the modulating signal is applied to the accelerator electrode 22. The modulating voltage applied to the accelerating electrode, which acts similar to a control grid, causes current through the backward wave tube to vary. When this current variation is impressed across the impedance of the tuned circuit 25, the anode voltage of the backward wave tube changes to sweep the tube through the frequency band. The modulator tube 29 in modulating circuit 4*a* acts similar to a class A amplifier, and the driving power requirements are reduced to less than 1 watt. For the foregoing reason, the screen grid 295 of tube 29 can be connected to the same source of voltage as the plate 296 at terminal 6 and the voltage reduced from 900 volts to 400 volts direct current. The 2 kilocycle oscillator 28 operates at the frequency of the tuned circuit 25 which is equivalent to the plate circuit of a conventional tube, the gain of the backward wave tube reducing the driving power requirements to the input of the modulator tube 29. In operation, therefore, the 5 to 10 watt alternating current component ofthe resonant circuit losses is derived from the main anode supply 23. The traveling wave tube current remains at an average value of 300 milliamperes and contains an alternating current component which maintains the desired sweep voltage across the choke coil 21, which causes the traveling wave tube to sweep the predetermined frequency band of approximately 2500 to 3300 megacycles per second.

Referring now to FIG. 5, two backward wave tubes, such as described in FIGS. 1 to 4, are represented by the reference numerals 14*a* and 14*b*. Energy is removed from the end of the signal transmission network 13 by means of output coupling 43 and fed to the input coupling means 45 of traveling wave tube 14*b*. In order to achieve proper locking of the traveling wave tubes, it is preferable that the frequency of operation of each tube, will by itself, be near that of the other tube or tubes. In order to insure that the normal free running frequencies of operation of the traveling wave tubes do not differ appreciably, it may be necessary to compensate for individual differences in construction and in electrode voltages of these tubes by means of a bias voltage source (not shown), or by means of adjusting the accelerator supply 24 until the operating frequencies are substantially equal. If the devices have substantially identical characteristics, the bias sources may, as shown herein, be omitted. In addition, attenuation may be introduced at the end of tube 14*a* remote from the output end in order to reduce reflections from the driven traveling wave tube 14*b* back through the system into the driver tube 14*a* and also to take care of reflections which may arise at the interconnection between the tubes. As noted previously, this attenuation may take the form of a thin coating of lossy material, such as graphite, applied to the end of signal transmission line 13. It should be noted, however, that the invention does not necessarily contemplate the use of attenuation; in some instances, the reflected energy may be of insufficient magnitude to prove troublesome.

Energy generated by the driving traveling wave tube 14*a* is removed therefrom by means of output coupling device 43 and is applied to the input coupling device 45 of the driven traveling wave tube 14*b* by way of a transmission line 121 which may be, for example, a coaxial line. In accordance with the invention, each traveling wave tube has a tuned circuit 25 in series with the anode supply and its respective anode 17. In order to insure that the two traveling wave tubes sweep at substantially the same frequency, the modulating voltage is fed from a 2 kilocycle alternating current source 28 and by way of the modulator 4*a* to the individual tuned circuits through coupling capacitors 30*a* and 30*b*. This circuit insures reliability of output because each traveling wave tube has a separate power supply and in the event of tube failure, the remaining operative tube would function as an oscillator and transmit an output to antenna 11. This is possible because the attenuation of the inoperative traveling wave tube is very low and will not substantially impair the output signal from the operating oscillator tube.

In FIG. 6, a modification of the system of FIG. 5 is shown wherein the modulating voltage from the 2 kilocycle oscillator 28 and modulator or amplifier 4*a* is simultaneously applied to the acceleration electrode 22 of each traveling wave tube instead of to each tuned circuit 25, thereby using the power gain of the traveling wave tubes to reduce the driving power requirements. To insure proper locking of the traveling wave tubes over the entire sweep frequency band, a common acceleration electrode supply 24 and a single audio choke 36*a* is used to supply the acceleration voltage, the driving voltage being introduced from the oscillator 28 through coupling capacitor 30. Here again, the oscillator 28 is adjusted to the resonant frequency of the tuned circuit for maximum modulator efficiency. However, it should be understood that an oscillator frequency different from the resonant frequency of the tank circuit 25 can be used with a corresponding increase in the required drive voltage and, consequently, in the alternating component of the traveling wave tube anode current.

Figure 7:
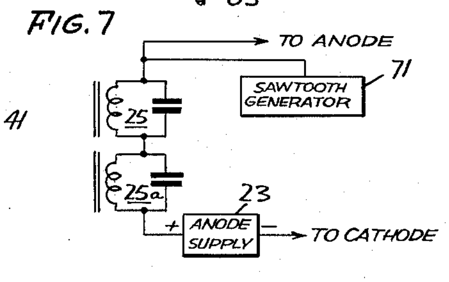
FIG. 7 is a modification of one part of the circuit of FIG. 1.

In FIG. 7, there is shown a circuit arrangement in which an additional tank circuit 25a is connected in series with the anode supply 23 and with the cathode and anode of the backward wave tube. The additional tank circuit 25*a* is tuned to the uneven harmonic of the alternating current component of the fundamental tank circuit 25 to produce a more sawtooth-like sweep voltage than the relatively sinusoidal output produced with a single tank circuit. It should be noted that the fundamental tank circuit 25 is fed with a sawtooth voltage from a sawtooth oscillator 71, which is tuned to the fundamental resonant frequency of tank circuit 25. In this manner, an economy in magnetic components, such as a broadband modulation choke, may be gained which, however, is not to be considered essential to the invention.

Figure 8:
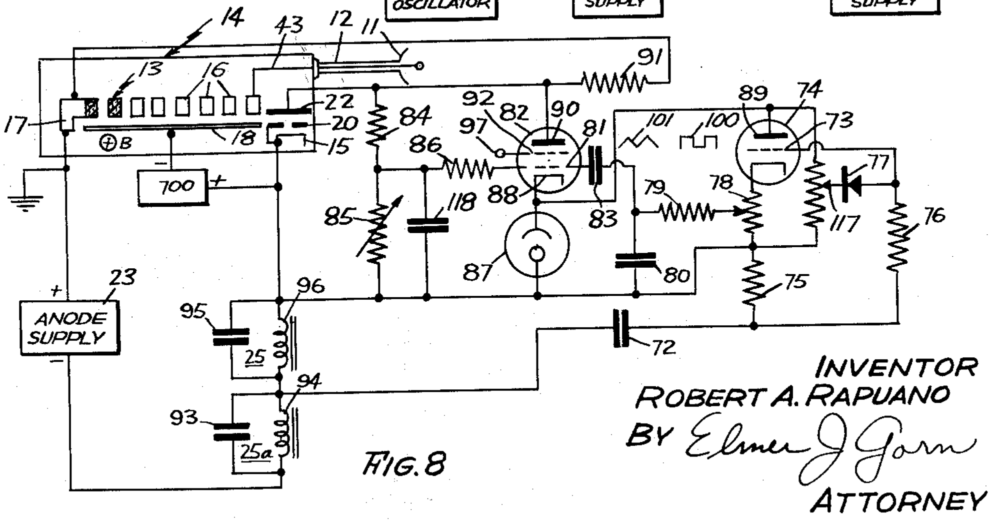
FIG. 8 is a schematic diagram of a further embodiment of the modulating system in which the backward traveling wave tube generates a sawtooth sweep voltage.

FIG. 8 is a schematic diagram of a further modification of the system according to the invention in which the backward wave tube 14 generates its own sawtooth modulating voltage. In this embodiment, a portion of the voltage developed across the fundamental tank circuit 25, herein shown in the cathode circuit of the traveling wave tube, is fed back by way of a feedback loop including 100 micromicrofarad feedback capacitor 72 and an appropriate phase-correcting circuit to the grid 73 of a 5703 type limiter tube 74. The phase-correcting or input circuit comprises a coupling resistor 75 of approximately 60,000 ohms., a 1.0 megohm isolation resistor 76, and the capacitor 72. This circuit feeds a voltage of sufficient amplitude to permit proper operation of a limiting circuit including a typical diode 77, a level potentiometer 117 and the tube 73. On positive swings of the input sinusoidal voltage, the limiter circuit will prevent the voltage exceeding the value set on the diode potentiometer 117. The limiter tube 74 is cut off during negative swings of the input voltage at values determined by the bias applied to the tube. A portion of the feedback voltage is developed across the cathode follower 100,000 ohm. potentiometer 78 and is fed to an integrating circuit comprising a 100,000 ohm. resistor 79 and a .003 microfarad capacitor 80. The aforementioned RC circuit utilizes a limited portion of the sine wave at 100 from the cathode of tube 74 and generates a sawtooth voltage 101 which is applied to the grid 81 of a 6AR6 type tube 82 through a .03 microfarad coupling capacitor 83. A direct current regulated feedback voltage is developed across a 1 megohm voltage dividing resistor 84 and a .5 megohm voltage dividing potentiometer 85 shunted by a .02 microfarad condenser 118 which prevents the A.-C. component of the plate voltage of tube 74 from being fed back to the grid. The feedback voltage is also fed to the grid 81 of tube 82 through a 200,000 ohm isolating resistor 86 and maintains the average value of the plate voltage of tube 82 constant and at a predetermined level according to the desired setting of the potentiometer 85. A voltage regulator tube 87 of the OA2 type is connected to the cathode 88 and is used as a voltage reference for the regulator tube 82 and as a plate supply for the limiter tube 74. As shown, cathode 88 of tube 82 is connected to the plate 89 of tube 74. In operation, the voltage applied to the grid 81 of tube 82 is amplified and developed across the 240,000 ohm plate resistor 91, and the output at plate 90 of the tube 82 is in the form of a sawtooth voltage and is applied directly to the acceleration electrode 22 of the traveling wave tube. The current of the traveling wave tube is, in this manner, caused to vary, which develops a voltage across the fundamental tank circuit 25 and maintains oscillation throughout the feedback loop. The additional tank circuit 25*a* in the cathode of the traveling wave tube comprises a .006 microfarad capacitor 93, a .1 henry choke 94 and oscillates at the third or uneven harmonic of fundamental tank 25. This third harmonic tank circuit is used to develop a voltage which corresponds to the non-sinusoidal current developed by the integrator and limiter circuit. In this manner, an approximately linear sweep is generated, the aforementioned limiter generating a non-sinusoidal voltage which controls the amplitude of the sawtooth sweep voltage to a desired level according to the setting on voltage level potentiometer 78. In order to operate at a fundamental frequency, tank circuit 25 comprises a .012 microfarad capacitor 95 and a .5 henry choke coil 96 tuned to the sweep cycle nominal frequency. The screen supply for the regulator tube 82 may consist of a voltage divider of approximately 20 volts applied to screen grid 92 of tube 82 at terminal 97. As noted, the appropriate limited square wave output from the plate of tube 73 and the sawtooth voltage developed by the RC circuit 79 and 80 are shown by the approximately square wave form 100 and the sawtooth wave form 101.

It should be understood that oscillation may be sustained in the fundamental tank circuit 25 without the use of a separate limiter or amplifier because the gain developed between the accelerator electrode 22 and the tank circuit 25 of the backward wave oscillator is greater than unity, the condition required for oscillation. Moreover, a variety of similar circuits well known to the art can be used to determine the phase and amplitude of the feedback voltage.

This invention is not limited to the particular details of construction, materials and processes described, as many equivalents will suggest themselves to those skilled in the art. For example, the resonant tank circuit 25 may be connected, as shown, in the cathode circuit of the traveling wave tube instead of the anode circuit to permit direct grounding of the anode in the usual manner. Therefore, when the modulating voltage is applied between the acceleration electrode 22 and ground, the alternating current components of the modulating voltage and the tank voltage 25 are essentially equal and independent of small variations of the traveling wave tube parameters. Also, as noted in FIG. 1, a single inductance 21 may be inserted in the anode circuit of the traveling wave tube, the only shunt capacitance being that of the traveling wave tube itself. The resonant circuit 25 is not restricted to a sinusoidal drive voltage, a plurality of wave forms other than sinusoidal may be applied, and any sweep frequency may be developed, limited only by the desired efficiency of the modulator system. For example, if the inductance of the choke coil 21 is increased, a lower modulating frequency can be used for a given power dissipated in the modulator tube 29. It should also be understood that any voltage tunable traveling wave tube may be used. Also, under certain conditions, the impedance in the anode circuit may be deliberately reduced so that the anode current of the backward wave oscillator undergoes large variations during the modulating cycle. This may be desirable to insure constant power output from the backward wave oscillator because the anode input power is then kept more nearly constant during the modulating cycle. It is accordingly desired that the appended claims be given a broad interpretation commensurate with the scope of the invention within the art.

What is claimed is:

1. In combination, a traveling wave device voltage tunable through a predetermined frequency band and having a plurality of electrodes adapted to control the frequency band swept by said traveling wave device, means for applying a voltage to said frequency determining electrodes, a resonant energy storage device in circuit with one of said electrodes and said voltage means, said resonant frequency storage device tuned to a predetermined sweep frequency, and means for exciting said resonant storage device with a modulating voltage.

2. An electrical system for transmitting oscillatory energy over a predetermined frequency range in response to a modulating voltage including a backward wave device of the type including an anode in the form of a delay line, means including a cathode for propagating an electromagnetic wave along said delay line to generate oscillatory energy, output means for removing said oscillatory energy from said backward wave device, a modulation source, means for applying a modulating voltage, provided by the modulation source, between said anode and said cathode, and resonant storage means tuned to the frequency of said modulating voltage in circuit with said anode and said cathode, whereby the anode voltage applied to said device varies at the frequency of said modulating voltage.

3. An electrical system for transmitting oscillatory energy over a predetermined frequency band including a backward wave voltage tunable device of the type including an anode in the form of a wave interaction path, means including a cathode and an accelerator electrode for forming an electron stream which flows along said wave interaction path to produce oscillatory energy, means for extracting said oscillatory energy from said backward wave device, a source of anode voltage connected in circuit with said cathode and said anode, a resonant storage circuit connected in series with said anode supply source and said anode and tuned to a predetermined sweep frequency, and a source of modulating voltage varying at the frequency of said resonant storage circuit applied between accelerator electrode and said cathode, whereby the backward wave device is swept through said predetermined frequency band at the tuned frequency of said resonant storage circuit.

4. An electrical system for transmitting electromagnetic energy over a predetermined frequency range comprising a backward wave device tunable through said frequency range, said backward wave device including a wave interaction path having a reflectionless termination at each end of said path, means for forming an electron beam which flows along said path, a plurality of electrodes adjacent said path adapted to change the frequency of oscillation of said device in response to a modulating voltage applied to said electrodes, means for applying said modulating voltage between two of said frequency determining electrodes, a resonant energy storage device in circuit with one of said electrodes and said modulating voltage, said modulating voltage being derived from an oscillator operating at the resonant frequency of said energy storage device.

5. An electrical system for transmitting oscillatory energy over a predetermined frequency range in response to a modulating voltage including a traveling wave device of the type including an anode in the form of a delay line, means including a cathode for propagating an electromagnetic wave along said delay line to generate oscillatory energy, a source of anode voltage, connections for applying said anode voltage between said anode and said cathode, storage means operating at a predetermined sweep frequency in circuit with said anode voltage, and means for applying a modulating voltage to said storage means at said predetermined sweep frequency.

6. In combination, a backward wave device voltage tunable through a predetermined frequency range, said backward wave device including a plurality of electrodes for controlling the frequency range through which said device is tunable, a source of voltage for said electrodes, means for cyclically sweeping said device through said predetermined band of frequencies including a resonant storage device in circuit with one of said frequency determining electrodes and said electrode supply voltage, said resonant storage device tuned to a predetermined sweep frequency, and oscillator means feeding said resonant storage device and tuned to said sweep frequency.

7. An electrical system for transmitting electromagnetic energy over a predetermined frequency band comprising a first backward wave device having an input and an output coupling, a second backward wave device having an output coupling, means for connecting the output coupling of the second backward wave device to the input coupling of the first backward wave device, each of said backward wave devices having a plurality of electrodes for sweeping said backward wave devices over said predetermined frequency band, said electrodes including an anode and a cathode, a separate source of anode voltage for each backward wave device, a tuned circuit connected in series with each anode and each source of anode voltage, and means for simultaneously applying a modulating voltage to each tuned circuit, whereby each of said backward wave devices is swept at the frequency of said modulating voltage.

8. In combination, first and second voltage tunable backward wave devices having a plurality of electrodes for controlling the frequency band through which said devices are tunable including an anode, a cathode and an accelerator electrode, means connecting the output of said first backward wave device to the input of said second backward wave device, a separate source of anode voltage adapted to be connected between the cathode and anode of each backward wave device, a tuned circuit connected in series with the anode and source of anode voltage for each backward wave device, and oscillator means tuned to the frequency of each resonant storage circuit applying a modulating voltage to excite each resonant storage circuit at a predetermined sweep frequency.

9. In combination, a backward wave device having a plurality of electrodes, a direct current power supply adapted to set a direct current bias on one of said electrodes, a source of modulating voltage applied to said one of said electrodes, and a coupling impedance in series with said one of said electrodes and said power supply and tuned to the frequency of said modulating voltage to vary the voltage from the direct current power supply around a predetermined fixed value.

10. In combination, a traveling wave tube having a plurality of electrodes for determining the operating frequency of said tube, a power supply to set a direct current bias on said electrodes, a source of modulating voltage adapted to be applied to said tube, and a resonant coupling circuit in series with said power supply and one of said electrodes and connected to the modulation voltage to produce an alternating current component varying around the direct current bias on said tube.

11. An electrical system for transmitting electromagnetic energy over a predetermined frequency band comprising a first backward wave device having an input and an output coupling, a second backward wave device having an output coupling, means for connecting the output coupling of the second backward wave device to the input coupling of the first backward wave device, each of said backward wave devices having a plurality of electrodes for sweeping said device through said frequency range, said electrodes including an anode, an accelerator electrode, and a cathode, a separate source of anode voltage for each backward wave device, a tuned circuit connected in series with each anode and each source of anode voltage, and means for simultaneously applying a modulating voltage to each accelerator electrode, whereby each of said backward wave devices is swept at the frequency of said modulating voltage.

12. In combination, a voltage tunable backward wave device having a plurality of electrodes for determining the operating frequency of said device, means for applying a direct current bias to one of said electrodes, a source of modulating voltage adapted to be applied to said one of said electrodes, and resonant coupling means tuned to the frequency of said modulating voltage in circuit with said direct current bias and said one of said electrodes to produce an alternating current component of said direct current bias source to sweep said device at the frequency of said modulating voltage.

13. In combination, a voltage tunable backward wave device having a plurality of electrodes including an anode, an accelerator electrode and a cathode, means for applying a direct current source of bias to said anode, a resonant circuit in series with said source of bias and said anode, and a source of modulating voltage applied to said accelerator electrode, said resonant circuit tuned to the frequency of said modulating voltage.

14. In combination, a signal amplifier device having a traveling wave interaction between an electron stream and signal energy in which the signal energy producing said interaction travel in an opposite direction to the movement of said electron stream, means for cyclically sweeping said device through a predetermined frequency range including a resonant storage circuit, said means including means for applying direct current to said device through said resonant storage circuit, and means for applying a modulating voltage to said resonant storage circuit at the frequency of resonance of said storage circuit.

15. In combination, a signal amplifying device having a traveling wave interaction between an electron stream and signal energy in which the signal energy producing said interaction travels in an opposite direction to the movement of said electron stream, means for sweeping said device through a predetermined frequency range including a tuned storage circuit, means for applying a voltage to said device through said tuned storage circuit, and means for applying a modulating voltage to said tuned storage circuit.

16. An electrical system for transmitting oscillatory energy over a predetermined frequency band including a backward wave voltage tunable device of the type including an anode in the form of a wave interaction path, means including a cathode and an accelerator electrode for forming an electron stream which flows along said wave interaction path to produce oscillatory energy, means for extracting said oscillatory energy from said backward wave device, a source of anode voltage connected in circuit with said cathode and said anode, a resonant tuned circuit connected in series with said anode supply source and said cathode and tuned to a predetermined sweep frequency, and a source of modulating voltage varying at the sweep frequency of said resonant tuned circuit applied to the accelerator electrode, whereby the modulating voltage and the voltage developed across said resonant tuned circuit are essentially equal.

17. In combination, a backward wave device voltage tunable through a predetermined frequency band and having a plurality of electrodes adapted to control oscillation in said backward wave device, means for applying a voltage to said electrodes, a resonant energy storage device adapted to develop a voltage output in circuit with one of said electrodes and said voltage means, said resonant frequency storage device tuned to a predetermined sweep frequency, and feedback circuit means for applying said voltage output developed across said resonant energy storage device to another electrode of said backward wave device to sustain oscillation in said resonant energy storage device.

18. In combination, a traveling wave device having a plurality of electrodes for determining the operating frequency of said device in response to the application of a sweep voltage to said electrodes, a source of voltage, a tuned circuit in series with said voltage source and one of said frequency determining electrodes, and a feedback loop coupling energy directly from said resonant tuned circuit back to another of said electrodes in a manner adapted to sustain oscillation.

19. A traveling wave device having a plurality of electrodes for determining the frequency of operation of said device, said electrodes including a cathode, an anode and an accelerator electrode, an anode voltage source, a tuned circuit connected in series with said anode, said cathode and said source of anode voltage, a feedback loop including a voltage limiting circuit connected in series with a sawtooth generating device, said feedback loop connected in circuit with said tuned circuit and said accelerator electrode for maintaining oscillation in said traveling wave device.

References Cited in the file of this patent

UNITED STATES PATENTS

| | | |
|---|---|---|
| 2,172,152 | Farnsworth | Sept. 5, 1939 |
| 2,603,773 | Field | July 15, 1952 |
| 2,726,332 | Arditi et al. | Dec. 6, 1955 |
| 2,806,177 | Haeff | Sept. 10, 1957 |
| 2,820,901 | Johnson | Jan. 21, 1958 |
| 2,840,752 | Cutler | June 24, 1958 |
| 2,844,797 | Dench | July 22, 1958 |